Aug. 5, 1947.    G. C. ELLERBECK    2,425,178
MOTOR CONTROL
Filed Nov. 27, 1943
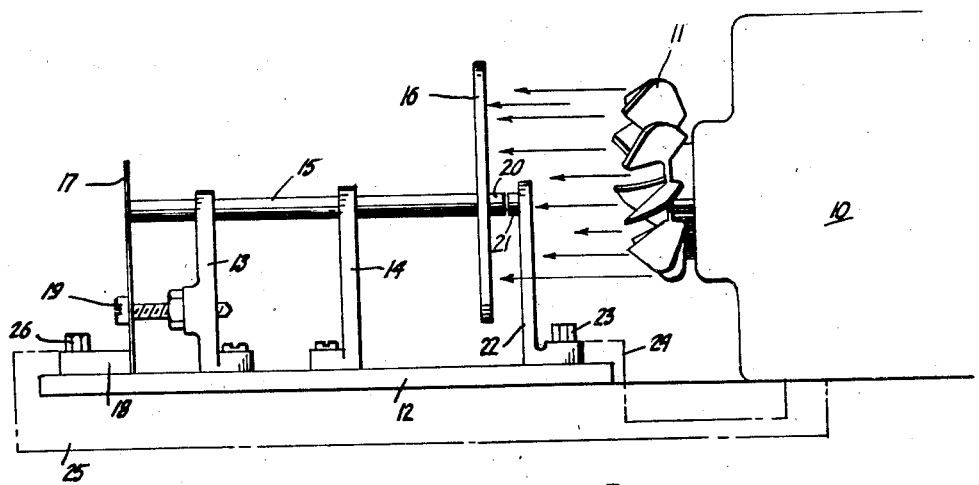
FIG_1
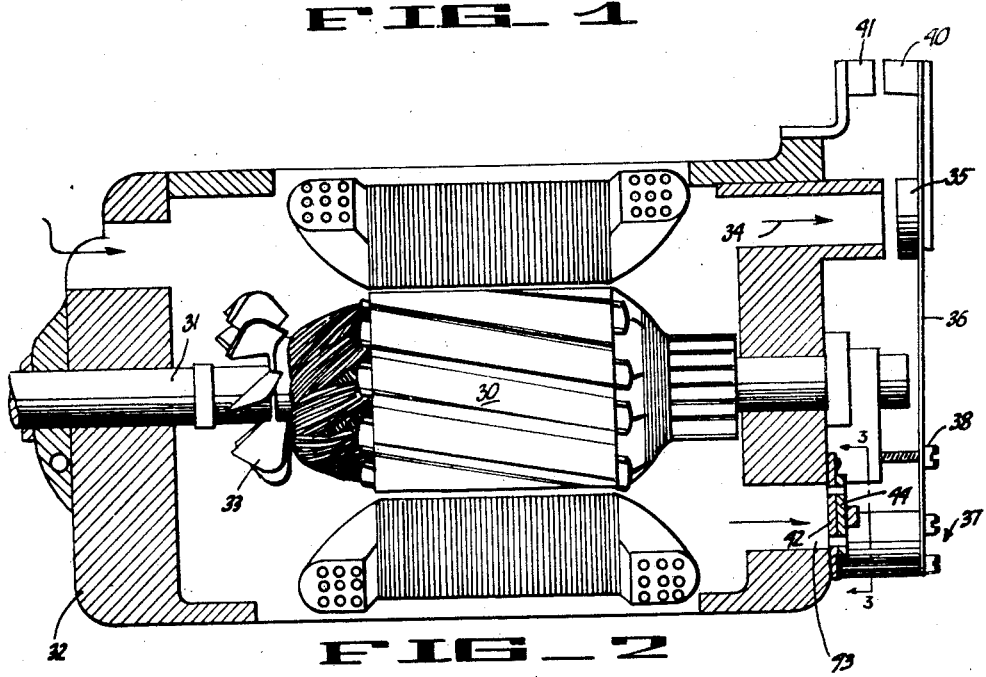
FIG_2
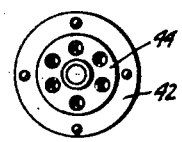
FIG_3
INVENTOR.
GRANT C. ELLERBECK
BY
ATTORNEY.

Patented Aug. 5, 1947

2,425,178

UNITED STATES PATENT OFFICE 2,425,178

MOTOR CONTROL

Grant C. Ellerbeck, San Leandro, Calif., assignor to Friden Calculating Machine Co., Inc., a corporation of California Application November 27, 1943, Serial No. 512,024

1 Claim. (Cl. 171—222)

This invention relates to electric motors and particularly to means for controlling the speed thereof.

The object of the invention is to provide a device for controlling the speed of an electric motor which is responsive to air pressure.

In the drawings:

Fig. 1 illustrates an apparatus for demonstrating the principle of operation.

Fig. 2 is a sectional view of an electric motor in which my invention has been embodied.

Fig. 3 is a detail view taken as indicated by the line 3—3 in Figure 2.

Referring to Figure 1, the motor 10 is provided with a fan 11 which is secured to the armature shaft. Mounted on a block of insulation 12 are brackets 13, 14 in which a shaft 15 is slidably supported for axial movement. At the end adjacent the fan, the shaft 15 has secured thereto a disc 16 which is subjected to air pressure from the fan 11, this pressure varying in accordance with the speed of rotation of the fan.

The air pressure tends to move the disc 16 toward the left, and this movement is opposed by a leaf spring 17 secured to a block 18 mounted on the block of insulation 12. The pressure exerted on the disc 16 by the spring 17 can be adjusted by means of the screw 19 which is threaded into the bracket 13. The right end of the shaft 15 carries a contact point 20 adapted to cooperate with the contact point 21 supported by a bracket 22. A binding post 23 is provided on the bracket 22 for connecting a wire 24 in the motor circuit and similarly a wire 25 can be connected to the binding post 26.

In operation, when the motor is idle or running slowly, the spring 17 maintains the contact 20 in engagement with the contact 21 so that the motor circuit is established. Upon an increase of speed of the motor, the pressure exerted by the fan on the disc 16 increases until this pressure overcomes the counteracting pressure of the spring 17 and, at the pre-determined speed for which the apparatus is set, removes the contact 20 from engagement with the contact 21 thereby opening the motor circuit. Consequent reduction in the speed of the motor results in reduced air pressure on the disc 16 whereupon the spring 17 again closes the contacts. In this way by adjusting the screw 19, the apparatus can be made to serve as a governor to maintain the motor at constant speed. The apparatus can also be employed for changing the speed of the motor by turning the screw 19. This use would be particularly adaptable when applied to an electric fan.

Figure 2 shows a motor of well-known construction, comprising an armature 30 on a shaft 31 journalled in a casing 32. A fan 33 is mounted on the armature shaft for ventilating the motor. The exhaust from this fan is directed as indicated by the arrow 34 against a disc 35 mounted on a leaf spring 36 secured at its lower end at 37 to the casing 32. The pressure of the spring 36 may be adjusted by means of the screw 38 which is threaded into the casing 32. At the upper end of the spring 36 is a contact 40 which cooperates with the contact 41 suitably mounted on the casing 32. As the motor speed increases, the air pressure against the disc 35 increases until the pressure of the spring 36 is overcome and the contact 40 is removed from contact 41. These contacts are connected in the motor circuit by means not shown.

In order to control the discharge of air against the disc 35, a perforated plate 42 may be secured over a discharge outlet 43. A second perforated plate 44 is adjustably secured to the inner plate 42. By rotating the plate 44 (Fig. 3) relative to the plate 42, the effective cross-sectional area of the discharge outlet may be adjusted, thereby increasing or decreasing the air pressure exerted against the disc 35.

In order to adjust the governor, the disc 44 may be adjusted to vary the air pressure or the screw 38 may be adjusted to vary the spring pressure or both. In any event it will be evident that the device can be so adjusted that upon increase in motor speed to a pre-determined point, sufficient air pressure is exerted against the disc 35 to open the contacts and that upon subsequent decrease in motor speed, the spring 36 will close the contacts.

I claim:

A governor for an electric motor provided with a ventilating fan, a leaf spring having means thereon to provide a surface subject to the pressure of air from said fan, said spring tending to oppose said air pressure, electric contacts in the motor circuit, movement of said spring serving to open and close said contacts to govern the speed of said motor in accordance with air pressure exerted by said ventilating fan, and an adjustable outlet in the casing of the motor to vary the effective air pressure on the governor.

GRANT C. ELLERBECK.

REFERENCES CITED

The following references are of record in the file of this patent:

UNITED STATES PATENTS

| Number | Name | Date |
|---|---|---|
| 2,144,734 | Jepson | Jan. 24, 1939 |
| 2,292,567 | Jordan | Aug. 11, 1942 |
| 1,494,189 | Russell et al. | May 13, 1924 |
| 2,092,955 | Chamberlen et al. | Sept. 14, 1937 |
| 2,312,241 | Drackenberg | Feb. 23, 1943 |